Nov. 11, 1952 — L. H. GARDNER — 2,617,444
VALVE
Filed May 26, 1944 — 3 Sheets-Sheet 1

INVENTOR.
LAWRENCE H. GARDNER
BY
Edwin J. Balluff
ATTORNEY

Nov. 11, 1952     L. H. GARDNER     2,617,444
VALVE

Filed May 26, 1944     3 Sheets-Sheet 2

INVENTOR.
LAWRENCE H. GARDNER
BY
Edwin J. Balluff
ATTORNEY

Nov. 11, 1952     L. H. GARDNER     2,617,444
VALVE

Filed May 26, 1944     3 Sheets-Sheet 3

INVENTOR.
LAWRENCE H. GARDNER
BY
Edwin J. Balluff
ATTORNEY

Patented Nov. 11, 1952

2,617,444

UNITED STATES PATENT OFFICE 2,617,444

VALVE

Lawrence H. Gardner, Detroit, Mich., assignor to Automatic Valve, Inc., Detroit, Mich., a corporation of Michigan Application May 26, 1944, Serial No. 537,497

1 Claim. (Cl. 137—620)

This invention relates to a valve and more particularly to a valve which is suited to continuous high speed operation for controlling fluid pressure. The term fluid pressure as used herein contemplates a liquid or gas under pressure. Recent developments in apparatus operated by fluid pressure devices have emphasized the need for a valve which would accurately and rapidly control the fluid pressure flow to and from a fluid pressure cylinder. The conventional method of controlling the fluid pressure flow usually includes a valve which is provided with a valve seat or closure that is to be manually or electrically opened against the full line pressure. According to my invention the line pressure is utilized to effect the opening and closing of the main valve and this line pressure is in turn controlled by a small pilot valve which may be manually operated but preferably is electrically operated by a high speed device.

It is among the objects of my invention to provide a pilot controlled valve in which the pilot and main valve are constructed and arranged so that the valve is adapted to be continuously operated at a high speed.

It is a further object of my invention to provide a valve according to the preceding object wherein the main port closure is moved to and from closed position by a piston moved in both directions by line pressure.

It is a further object of my invention to provide a valve according to the preceding objects wherein the movement of the piston in a port opening direction is effected by exhausting to atmosphere line pressure on one side of the piston.

It is a further object of my invention to provide a valve having a main port opened and closed by a piston within a cylinder in which the piston is sealed with respect to the cylinder walls by a rolling type of packing made of synthetic rubber.

It is a further object of my invention to provide a valve wherein the main port is controlled by a piston within a cylinder which cylinder is in close coupled communication with a pilot valve whereby the volume of fluid pressure employed to effect opening and closing movements of the valve is reduced to a minimum.

Further objects and advantages relating to efficient operation, high speed operation, long life and economies in manufacture will appear from the following description and the appended drawings, wherein Figure 1 is a sectional view of the valve made according to my invention connected to a cylinder and ram arrangement to be controlled by the valve.

Figure 1:
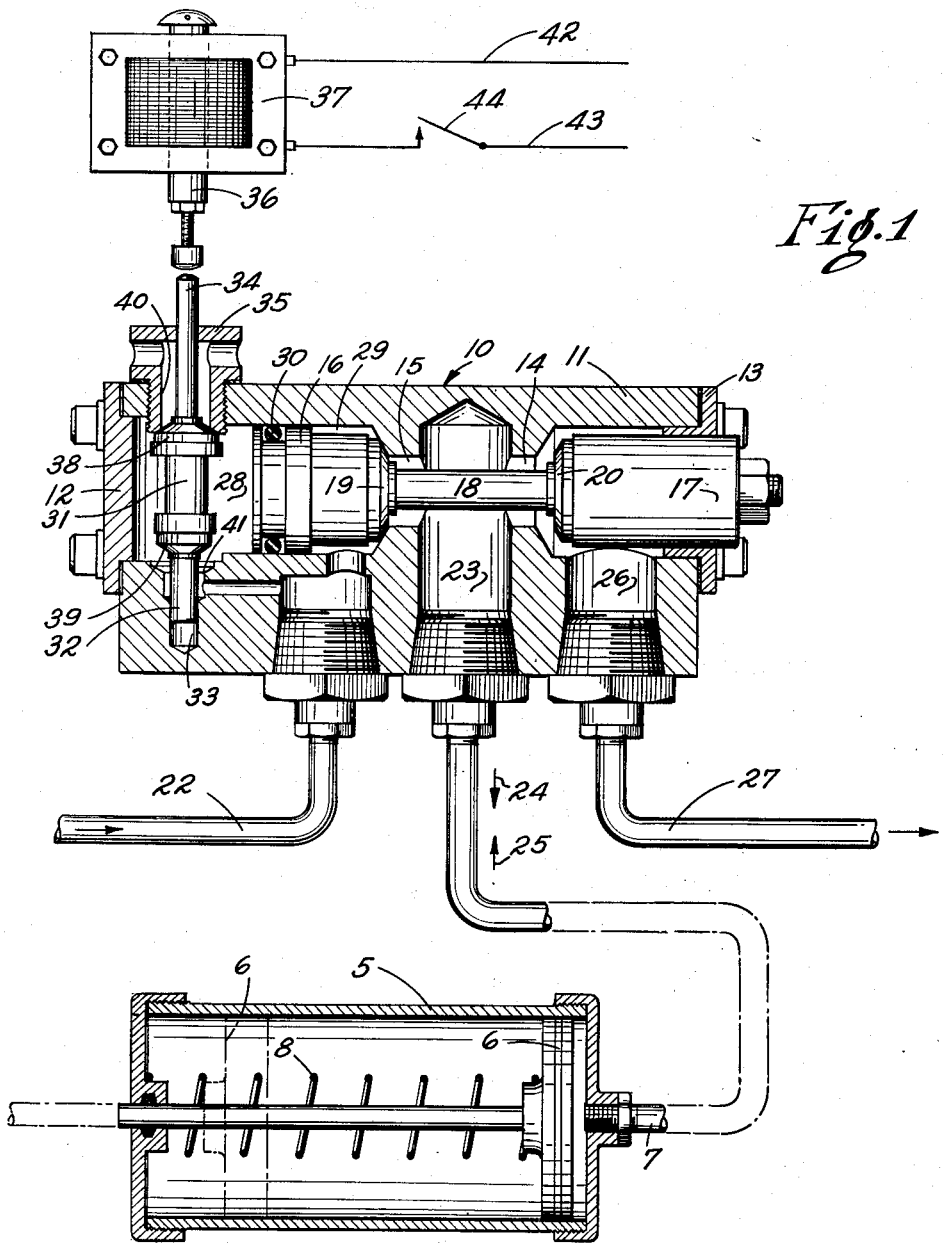

Referring to Figure 1 of the drawings, 5 indicates a cylinder within which is arranged a piston or ram 6 which is adapted to be moved in one direction by fluid pressure admitted to the end of the cylinder through the conduit 7 and is adapted to be moved in an opposite direction when the fluid pressure is exhausted from the cylinder by the spring 8. The stem of piston 6 may project through the end wall of the cylinder for performing work. The valve for controlling the inlet or exhaust of the cylinder 5 is indicated in its entirety as at 10 and comprises a valve body 11 having a longitudinal bore therethrough which bore is closed at one end by a plate 12 and at the other end by an apertured guide 13. The longitudinal bore at its mid-portion is restricted in diameter so as to form the valve ports 14 and 15 having valve seats associated therewith. A piston and valve closure assembly is arranged in the longitudinal bore which comprises the piston 16 and the guide section 17 connected to each other by the stem 18. The piston is formed at one end to provide a port closure member 19 and the guide section 17 is similarly formed to provide a port closure 20. The piston and parts connected thereto just described is adapted to be moved to the left from the position shown in Figure 1 so that the port closure member 19 moves away from the seat of port 15 and the port closure member 20 is positioned so as to cooperate with the seat of the port 14 to close the same. This movement of the assembly 16—20 results in line pressure from the conduit 22 being admitted into the transverse bore 23 of the valve body and flowing therefrom in the direction of the arrow 24 into the cylinder 5. Upon returning the assembly 16—20 to the full line position, Figure 1, it will be observed that the fluid pressure theretofore stored in the cylinder 5 will flow in the direction of the arrow 25 out through the port 14, thence through the passageway 26 where it is exhausted to the atmosphere through conduit 27.

The reciprocating movement of the piston and the main port closure members is effected by varying the pressure on either side of the head of the piston 16. With the parts in the position shown in Figure 1, it will be observed that the line pressure available through conduit 22 fills the pilot valve chamber 28 and also fills the annular space 29 beneath the piston head. Since the port 14 is open to the atmosphere through the exhaust conduit 27, the fluid pressure in the chamber 28 is effective to hold the closure 19 against the seat of port 15. When, however, the pilot chamber 28 is exhausted to atmosphere and shut off from the line pressure, the line pressure in the annular space 29 is effective to move the piston to the left whereby port 15 is opened and port 14 is closed. Preferably the piston 16 is sealed with respect to the walls of the cylinder within which it operates by a rolling type of packing ring made of synthetic rubber. As will be understood by those familiar with this type of packing ring, the ring is deformed slightly in the ring groove of the piston and rolls to accommodate the limited movement of the piston. I have found that this type of sealing ring indicated at 30 will effectively accomplish a sealing of the piston even when operated at very high speeds such as for instance, several hundred times a minute without heating or causing any binding of the piston within the cylinder.

The opening and closing of the pilot chamber 28 with respect to atmosphere and line pressure is effected by a pilot valve indicated in its entirety as at 31. The pilot valve comprises an elongated stem having the lower end 32 thereof mounted for free sliding movement in the bore 33 of the valve body. The upper end 34 of the pilot valve projects outwardly through the exhaust cap 35 where it is adapted to be engaged by the armature 36 of a solenoid 37. Intermediate the ends of the pilot valve 31 are provided port closures or valve members 38 and 39 which are adapted to cooperate with seats associated with ports 40 and 41 respectively for closing the latter.

Lines 42 and 43 lead from a source of electrical energy to the solenoid 37. A variable high speed switch device indicated at 44 is adapted to rapidly open and close the circuit of the solenoid 37 for energizing the same so as to project the armature against the portion 34 of the pilot valve so as to move the pilot valve from the full line position shown to a position wherein the port 40 is opened and the closure 39 seals the port 41 against the admission of fluid line pressure. As the fluid pressure in the pilot chamber 28 is relieved by the opening of port 40, the fluid pressure (which corresponds to the line pressure in 22) is effective to move the piston 16 to the left which closes port 14 and opens the main port 15 and directs the flow of fluid pressure through passageway 23 in the direction of the arrow 24 to the cylinder 5. As soon as the switch 44 is opened and the solenoid 37 deenergized, the pilot is restored to its full line position shown in Figure 1 by the line pressure whereby the full head of the line pressure is effective to move the piston assembly to its full line position and exhaust the cylinder 5 through port 14, passageway 26 and exhaust 27. The variable speed switch device 44 may also be of the type in which the closed and open time interval of the solenoid circuit may be varied. It will be observed that the construction and arrangement which I have provided has reduced to a minimum the volume of air or other fluid pressure required to effect the opening of the main port 15 and that the fluid pressure employed to accomplish the opening of the port 15 is directed to the actuated cylinder 5 rather than exhausted to atmosphere. This close coupled arrangement which I have shown and described results in a valve having extremely high speed operating characteristics, such as for instance: 500 complete cycles of opening and closing per minute. Thus, a valve according to my invention is particularly well-suited to the actuation of welding equipment and the like.

Figure 2:
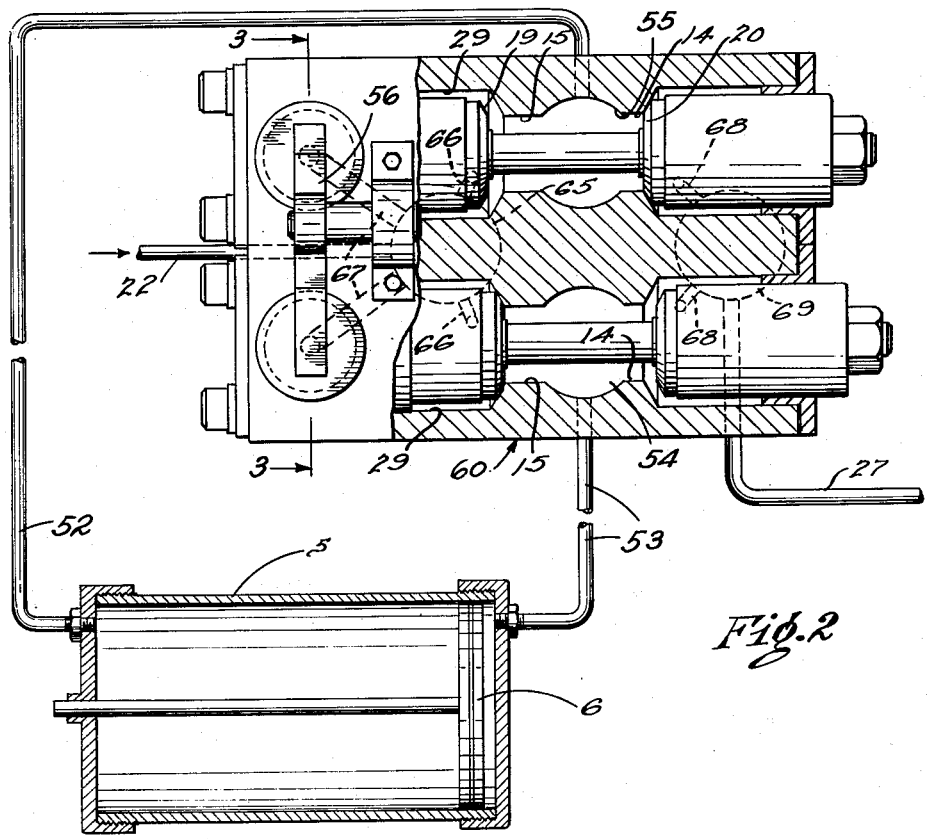
Figure 2 is a plan view of a modified form of my invention connected to a cylinder and ram whereby the ram is moved in two directions by fluid pressure controlled by the valve.

In certain installations it may be desirable to move the piston or ram of the actuated cylinder in both directions with fluid pressure and this may be accomplished according to my invention with the form of the invention illustrated in Figure 2. Cylinder 5 is provided with a piston or ram 6 and conduits lead from the valve indicated in its entirety at 60 to each end of the closed cylinder as at 52 and 53. The valve 60, according to the modification of Figure 2, comprises two asemblies such as shown in cross section in Figure 1, the outlet for one assembly being indicated at 54 and the outlet for the other assembly being indicated at 55. Preferably a pivoted lever 56 is mounted on the top of the valve body with the ends of the lever being disposed over the projecting portions 57 and 58 of the pilot valves 51 and 52'. The lever arrangement is such that when the switch 44 is open, the solenoid armature is in its raised position and is maintained in this position by the line pressure in the pilot valve chamber 61. The extension of the lever 56 on either side of its fulcrum and the area of the pilot valve ports is such that fluid pressure in the pilot chamber 61 can hold the pilot valve 52' in the other chamber 62 in its lowered position against the line pressure.

Line pressure through conduit 22 is supplied to chamber 65 in the valve body from whence it is supplied through passages 66 to the annular space 29 beneath th piston heads 16. From the chamber 65 line pressure is also supplied through passages 67 to the pilot chambers 61 and 62 under the control of the valve members 39 associated with the pilot valves 52' and 51. Outlets 54 and 55 also communicate through ports 14 and under the control of valve 20 and through passages 68 with a common discharge chamber 69 which is vented to atmosphere through conduit 27.

Figure 3:
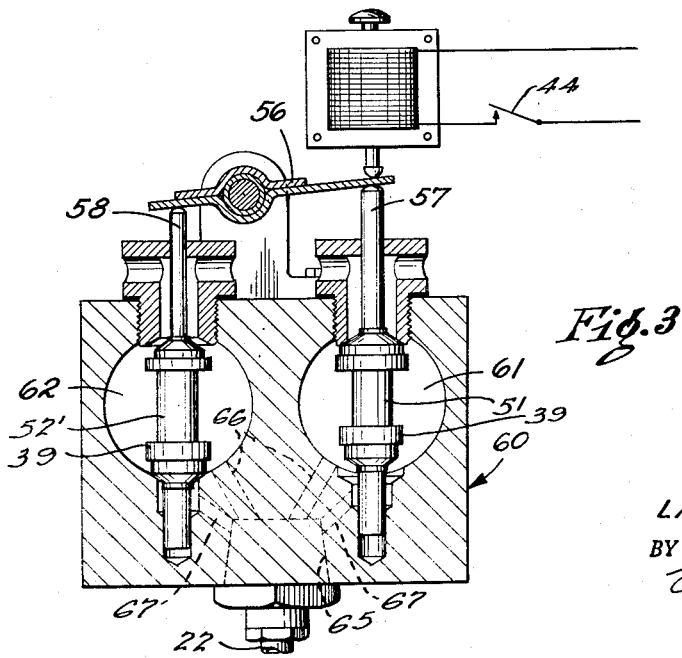
Figure 3 is a sectional view taken along the plane indicated at 3—3 of Figure 2.

When the solenoid is energized by closing the switch 44, the line pressure is exhausted from the chamber 61 whereby the line pressure is directed outwardly of the valve body by way of the outlet 54 and conduit 53. This actuation moves the piston or ram 6 from its full line position shown in Figure 2, to the other end of the cylinder. At the same time the other end of the cylinder is connected through conduit 52 and outlet 55, port 14, past valve 20 which is now open, through duct 68 and outlet chamber 69 to atmosphere. Subsequent opening of the switch will restore the pilot valves 51 and 52' to the full line positions illustrated in Figure 3 wherein fluid under pressure will be supplied through the conduit 52 to one side of the piston for moving the same toward the other end of the cylinder, and such other end of the cylinder will be connected through conduit 53, outlet 54, port 14, past valve 20, passage 68, and outlet chamber 69 to atmosphere. The flow of fluid pressure in and out of the valve body through conduits 52 and 53 is accomplished by means of piston and main port valve assemblies in accordance with the arrangement shown and described in the preferred embodiment of Figure 1, and except as hereinbefore indicated, the same reference characters have been used to designate corresponding parts.

Figure 4:
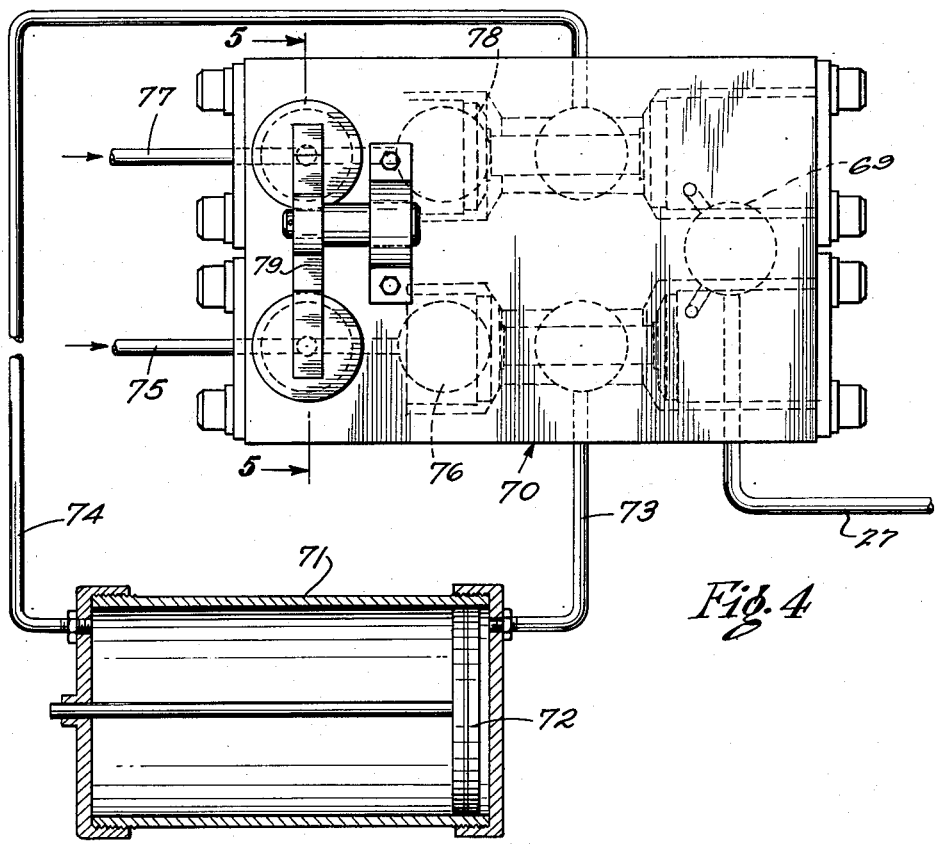
Figure 4 is a plan view of a further modification wherein the ram controlled by the valve is moved in opposite directions by fluid pressures obtained from two different sources.
Figure 5:
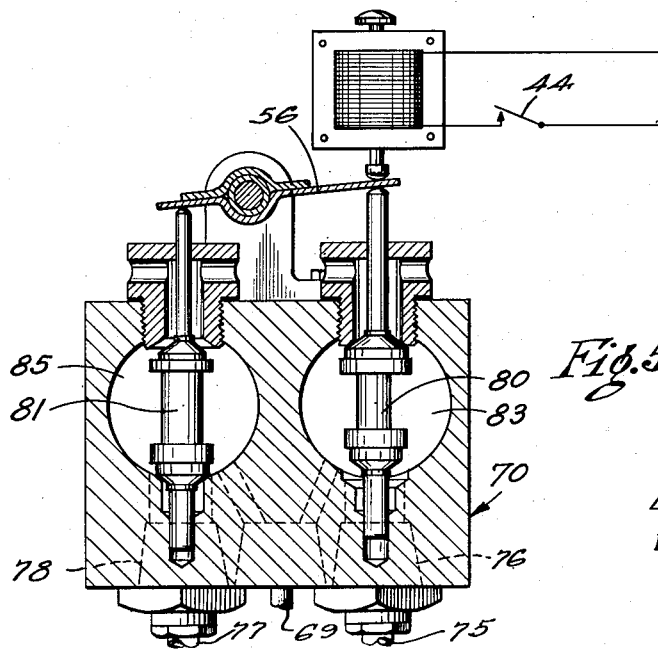
Figure 5 is a sectional view taken along the plane indicated at 5—5 of Figure 4.

A valve according to my invention is also adapted to those installations where it is desired to move an actuated piston or ram in one direction by one source of fluid pressure such as for instance: a high pressure, and to move the piston or ram in an opposite direction with another source of fluid pressure such as for instance: a low pressure. The modification illustrated in Figure 4 is an example of this use of my valve wherein the valve body in its entirety is indicated at 70 and includes two assemblies such as shown in Figure 1 having a common exhaust 69 like that illustrated in Figure 2. An actuated cylinder 71 and ram 72 is connected to the valve body 70 by means of conduits 73 and 74. The valve of this modification is provided with a high pressure inlet 75 terminating in a valve body inlet 76 and a low pressure inlet 77 terminating in a valve body 78. A pivoted lever 56 is mounted on the top of the valve body and is constructed and arranged with respect to pilot valves 80 and 81 substantially as described in connection with the modification of Figure 2. The arrangement of this modification provides that upon closing the line switch 44 the solenoid is energized and the high fluid pressure is exhausted from pilot chamber 83 so as to effect a flow of high fluid pressure out through the conduit 73 to move the ram 72 from the position shown in Figure 4 to the other end of the actuated cylinder 71. At the same time the other end of the cylinder is vented to atmosphere through conduit 74 through the common exhaust 69 and in the same manner as illustrated in Figure 2. As soon as the solenoid is deenergized by opening the switch 82, the flow of high fluid pressure through conduit 73 is interrupted and the high fluid pressure in the cylinder is exhausted to atmosphere through exhaust 69 and pipe 27. Simultaneously, therewith the pilot valve chamber 85 is exhausted to atmosphere so as to effect a main port opening and direct low fluid pressure into conduit 74, thus restoring the ram or piston 72 to its full line position shown in Figure 4.

Although I have shown a preferred embodiment and two modified forms of my invention, it will be appreciated by those skilled in the art that numerous modifications may be made therein without departing from the scope of the invention as defined in the following claim.

I claim:

Valve structure comprising an elongated solid body having aligned cylinders at opposite ends thereof open at the ends of said body and having an intermediate bore of reduced cross-section connecting the inner ends of said cylinders, oppositely facing valve seats at the junctions of said bore and cylinders, a compound valve device having in each cylinder a valve element cooperable with the adjacent valve seat and a piston spaced outwardly of the valve element, and a rigid stem extending through said bore and connecting said valve elements, a closure plate closing one of said cylinders, the piston in said one cylinder being spaced from said closure plate to provide a valve control chamber therein, said body having a transverse opening extending completely through a side wall thereof and opening into said chamber, an annular element mounted in said opening, said annular element having a bore therethrough providing a pilot valve seat within said control chamber, said body having a second bore aligned with the bore in said annular element and disposed diametrically across said control chamber therefrom and providing a second pilot valve seat within said control chamber, said pilot valve seats being disposed in diametrically confronting relationship across said control chamber, a pilot valve reciprocable in said aligned bores and having a pair of pilot valve elements thereon alternately cooperable with the respective pilot valve seats, said transverse opening being sufficiently large to permit passage of said pilot valve and pilot valve elements into said chamber, said body having an inlet passage having branches one of which extends to said chamber through one of said aligned bores and controlled by one of said pilot valve elements and the other of which extends to said one cylinder at a point intermediate the piston and valve element therein, the other pilot valve seat in said control chamber and the pilot valve element cooperating therewith constituting an exhaust valve for said control chamber, an outlet passage connected to said intermediate bore between the valve seats at the ends thereof, and an exhaust passage connected to the other cylinder outwardly from the valve seat at the inner end thereof.

LAWRENCE H. GARDNER.

REFERENCES CITED

The following references are of record in the file of this patent:

UNITED STATES PATENTS

| Number | Name | Date |
| --- | --- | --- |
| 410,180 | Ongley | Sept. 3, 1889 |
| 483,108 | Franke | Sept. 20, 1892 |
| 564,167 | Thompson | July 14, 1896 |
| 595,061 | Gulland | Dec. 7, 1897 |
| 629,794 | Lindsey | Aug. 1, 1899 |
| 824,658 | Jungren | June 26, 1906 |
| 1,083,810 | Engberg | Jan. 6, 1914 |
| 1,350,438 | Davidson | Aug. 24, 1920 |
| 1,961,599 | Schwitzer | June 5, 1934 |
| 2,187,114 | Ellwood | Jan. 16, 1940 |
| 2,204,808 | McNeal | June 18, 1940 |
| 2,296,145 | Christensen | Sept. 15, 1942 |
| 2,310,130 | Thumin | Feb. 2, 1943 |
| 2,329,254 | Dorman | Sept. 14, 1943 |

FOREIGN PATENTS

| Number | Country | Date |
| --- | --- | --- |
| 177,188 | Great Britain | of 1922 |
| 515,617 | Great Britain | of 1939 |